US008222779B2

(12) United States Patent
Kinpara et al.

(10) Patent No.: US 8,222,779 B2
(45) Date of Patent: Jul. 17, 2012

(54) STEPPING MOTOR

(75) Inventors: Shuhei Kinpara, Nagano (JP); Yuzuru Suzuki, Nagano (JP)

(73) Assignee: Minebea Co., Ltd., Nagano (JP)

( * ) Notice: Subject to any disclaimer, the term of this patent is extended or adjusted under 35 U.S.C. 154(b) by 176 days.

(21) Appl. No.: 12/853,489

(22) Filed: Aug. 10, 2010

(65) Prior Publication Data

US 2011/0089776 A1 Apr. 21, 2011

(30) Foreign Application Priority Data

Oct. 21, 2009 (JP) ................................ 2009-241999

(51) Int. Cl.
*H02K 3/50* (2006.01)
*H02K 37/14* (2006.01)

(52) U.S. Cl. ..................... 310/71; 310/49.01; 310/49.23

(58) Field of Classification Search ............... 310/49.13, 310/49.19, 49.11, 49.23, 49.31, 71
See application file for complete search history.

(56) References Cited

U.S. PATENT DOCUMENTS 3,800,175 A * 3/1974 Plotscher et al. ............. 310/164
4,825,112 A * 4/1989 Mineyama ...................... 310/71
4,924,124 A * 5/1990 Kato .............................. 310/43
5,004,941 A * 4/1991 Ohzeki et al. .............. 310/49.13
6,100,612 A * 8/2000 Satoh ......................... 310/49.01
6,909,208 B2 * 6/2005 Suzuki et al. ............. 310/49.13
7,053,517 B2 * 5/2006 Suzuki .......................... 310/257
7,880,359 B2 * 2/2011 Sonohara ...................... 310/194
7,990,000 B2 * 8/2011 Suzuki et al. .................. 310/71
2001/0026103 A1 10/2001 Suzuki et al.
2009/0066196 A1 3/2009 Suzuki et al.

FOREIGN PATENT DOCUMENTS

JP 2001-286090 A 10/2001
JP 2008-136302 A 6/2008

* cited by examiner

*Primary Examiner* — Burton Mullins
(74) *Attorney, Agent, or Firm* — Carrier Blackman & Associates, P.C.; Joseph P. Carrier; William D. Blackman

(57) ABSTRACT

A stepping motor includes: a cylindrical rotor assembly disposed around the rotation axis; a stator assembly including two stator units disposed around the rotor assembly and axially coupled to each other; and a terminal structure disposed at the axial center of the outer circumference of the stator assembly. The terminal structure includes: a terminal block cluster composed of four terminal blocks; and four terminals fixed respectively to the four terminal blocks. The four terminals each include: an internal connection portion to which one of two wire ends of the winding is connected; and an external connection portion which is disposed substantially parallel to the internal connection portion and which is connected to a driving circuit disposed externally. The four terminals are arranged in a line along a direction substantially orthogonal to the rotation axis, and the internal connection portion and the external connection portion are aligned along the rotation axis.

4 Claims, 7 Drawing Sheets

41
43B_1
43B_2
42
43a 45 46
37
32
29a 43A_1
33 (35)
29
43A_2
29
28
25
25
24a 24
23
22B
28
22A
21
27a
27
26
27b

STEPPING MOTOR

BACKGROUND OF THE INVENTION

1. Field of the Invention

The present invention relates to a PM stepping motor, and more particularly to a terminal structure of a PM stepping motor.

2. Description of the Related Art

A PM (permanent magnet) stepping motor (hereinafter referred to simply as "stepping motor") includes a rotor assembly including a circular cylindrical magnet having a plurality of magnetic poles disposed circumferentially, and a stator assembly including two stator units axially coupled to each other and disposed around the rotor assembly. Each of the two stator units includes a pair of yokes (inner and outer yokes) which each include a circular ring shaped base portion and a plurality of pole teeth disposed along the inner circumference of the base portion, bent upright and arranged in a comb-like manner, and which are disposed to oppose each other such that respective plurality of pole teeth mesh with each other, wherein a coil for exciting the pair of yokes is disposed around the intermeshing pole teeth (refer to, for example, Japanese Patent Application Laid-Open No. 2008-136302).

The exciting coil is structured usually such that a magnet wire is wound on a cylindrical bobbin disposed around the intermeshing pole teeth. Both ends (starting and finishing ends) of the wound magnet wire (winding) are wrapped around pin-like terminals implanted into, for example, a terminal block which is formed integrally with the bobbin so as to be located over the base portion of the inner yoke and a flange of the bobbin facing the base portion. The ends of the coil winding wrapped around the terminals as described above are soldered for ensuring electrical connection thereto. When an electrical signal from a control circuit disposed externally is applied via the terminals to the exciting coil structured as described above, each of the pole teeth of the pair of yokes is excited, whereby attraction force or repulsion force is generated between each pole tooth and the magnetic pole of the magnet thereby causing the magnet to rotate by a predetermined angle.

The ends of the coil winding may be reliably connected electrically to the terminals by, for example, plasma welding (fusion processing) rather than by using a soldering method. By using a welding method such as plasma welding, the use of solder is eliminated thus enhancing the safety and the environmental sustainability (refer to, for example, Japanese Patent Application Laid-Open No. 2001-286090).

FIG. 7 shows a terminal 81 adapted for connection by plasma welding disclosed in Japanese Patent Application Laid-Open No. 2001-286090, which has a biforked shape as a whole, specifically structured to integrally includes an internal connection portion 82 having an L-shape and having a magnet wire connected thereto, an external connection portion 83 connected to an external circuit, and a root portion 84 force-inserted into a terminal block 87 formed at a part of a flange 86 of a bobbin 85, wherein the external connection portion 83 and the root portion 84 are connected to each other so as to form a straight bar and one bar of the L-shaped internal connection portion 82 is orthogonally connected to the connection part between the external connection portion 83 and the root portion 84.

After one wire end of a coil winding formed on the bobbin 85 is wrapped around the internal connection portion 82 of the terminal 81 structured as described above, when a discharge current is applied to the internal connection portion 82 with the external connection portion 83 functioning as a grounding electrode, the one wire end of the winding can be plasma-welded to the terminal 81.

In a stepping motor disclosed in Japanese Patent Application Laid-Open No. 2001-286090, one pair (two) of terminals, to which, respectively, both wire ends of a coil winding to constitute one stator unit are connected, are arranged along a direction orthogonal to the rotation axis (defined orthogonal to the plane of the paper In FIG. 7). Also, the pair of terminals are disposed at a terminal block such that an internal connection portion having a magnet wire wrapped therearound and an external connection portion connected to an external circuit are aligned in a virtual plane (corresponding to "terminal alignment direction" to be described later) orthogonal to the rotation axis. Another pair (two) of terminals for another stator unit, which are arranged in the same manner as the one pair of terminals described above, are disposed to axially oppose the one pair of terminals (refer to FIG. 3 of Japanese Patent Application Laid-Open No. 2001-286090). That is to say, on the whole of the stepping motor, four terminals are arranged at a face of the terminal block in two arrays such that two terminals are provided in each array.

The number of motor steps must be increased in some cases for the purpose of increasing torque and enhancing resolution in rotor advance angle of a stepping motor. In order to increase the number of motor steps, it is required to increase the number of magnetic poles of a magnet and the number of pole teeth of yokes, but if the number of pole teeth is increased while maintaining the inner diameter of a stator, the width (circumferential dimension) of each pole tooth is inevitably reduced.

Under the circumstances described above, if the yokes are to be produced by punching, the thickness of a material plate to be punched must be reduced in consideration of the punching process limitation in order to reduce the width of the pole tooth or reduce a gap between adjacent pole teeth to thereby allow the number of pole teeth to be increased. Consequently, the thickness of a circular ring shaped base portion of the yoke must also be reduced, and the axial direction dimension of a terminal block formed at the outer circumference of the base portion of the yoke (inner yoke) is accordingly reduced, which results in making it difficult for the terminals to be arranged in two arrays in the axial direction. In order to cope with the difficulty, the thickness of a flange of a bobbin may be increased as one solution, but this hinders reduction of the stepping motor in the axial direction and does not necessarily make an acceptable solution.

SUMMARY OF THE INVENTION

The present invention has been made in light of the problems described above, and it is an object of the present invention to provide a stepping motor which incorporates a biforked terminal adapted to allow connection of a magnet wire without using solder and which still can be successfully downsized.

In order to achieve the object described above, according to an aspect of the present invention, there is provided a stepping motor which includes: a rotor assembly including a magnet and rotatably disposed around the rotation axis; a stator assembly including a first stator unit and a second stator unit which are disposed around the rotor assembly and axially coupled to each other and each of which includes a yoke and a winding to excite the yoke, wherein the yoke includes a circular ring shaped base portion and a plurality of pole teeth disposed along an inner circumference of the base portion and bent in an axial direction, and wherein the yoke of the first stator unit and the yoke of the second stator unit are in contract with each other thus defining an interface plane therebetween; and a terminal structure disposed at an outer circumference of the stator assembly along the interface plane and including a terminal block cluster to hold a plurality of terminals which pass to the winding an electrical signal from a driving circuit disposed externally and each of which includes a first terminal portion to which one of two wire ends of the winding is connected, and a second terminal portion which is disposed substantially parallel to the first terminal portion and to which the driving circuit is connected. In the stepping motor described above, the plurality of terminals are arranged in a line along a direction substantially orthogonal to the axial direction and that the first terminal portion and the second terminal portion of each of the plurality of terminals are aligned along the axial direction.

In stepping motor structured as described above, since the plurality of terminals, each of which includes the first terminal portion to which one of two wire ends of the winding is connected and the second terminal portion which is disposed parallel to the first terminal portion and to which the driving circuit is connected, are arranged in a line along the direction orthogonal to the axial direction, the axial length of the stepping motor can be reduced. Also, since the first terminal portion and the second terminal portion are aligned along the direction substantially parallel to the axial direction (terminal alignment direction), the distance between the first and second terminal portions can be increased without the necessity of increasing the dimension of the stepping motor measured along the direction orthogonal to the axial direction, which allows an easier work of winding a wire around the first terminal portion using an automatic winding machine.

In the aspect of the present invention, the first terminal portion may be located near the interface plane and the second terminal portion may protrude in the direction opposite to the direction where the winding whose one wire end is connected to the first terminal portion is disposed.

With the structure described above, when a magnet wire is wound around the plurality of pole teeth thereby forming the winding, the terminal (specifically the second terminal portion) does not hinder the winding work thus improving the workability of forming the winding.

In the aspect of the present invention, the terminal block cluster may include a plurality of terminal blocks which are disposed apart from one another and each of which individually holds one terminal, and a plurality of terminal blocks of the first stator unit and a plurality of terminal blocks of the second stator unit may mesh with each other.

With the structure described above, the distance between the terminals of each of the first and second stator units can be increased. Consequently, when the end of the magnet wire is wrapped on one terminal, the other terminal does not hinder the wrapping work thus further improving the workability of forming the winding.

In the aspect of the present invention, the terminal block cluster may include a guide groove for accommodating a bridge portion of the terminal configured to connect between the first terminal portion and the second terminal portion, and wherein a length of the guide groove may be at least one third of a length of the bridge portion.

With the structure described above, the terminal alignment direction can be set with an enhanced precision.

DETAILED DESCRIPTION OF THE INVENTION

An exemplary embodiment of the present invention will hereinafter be described with reference to the accompanying drawings.

Figure 1:
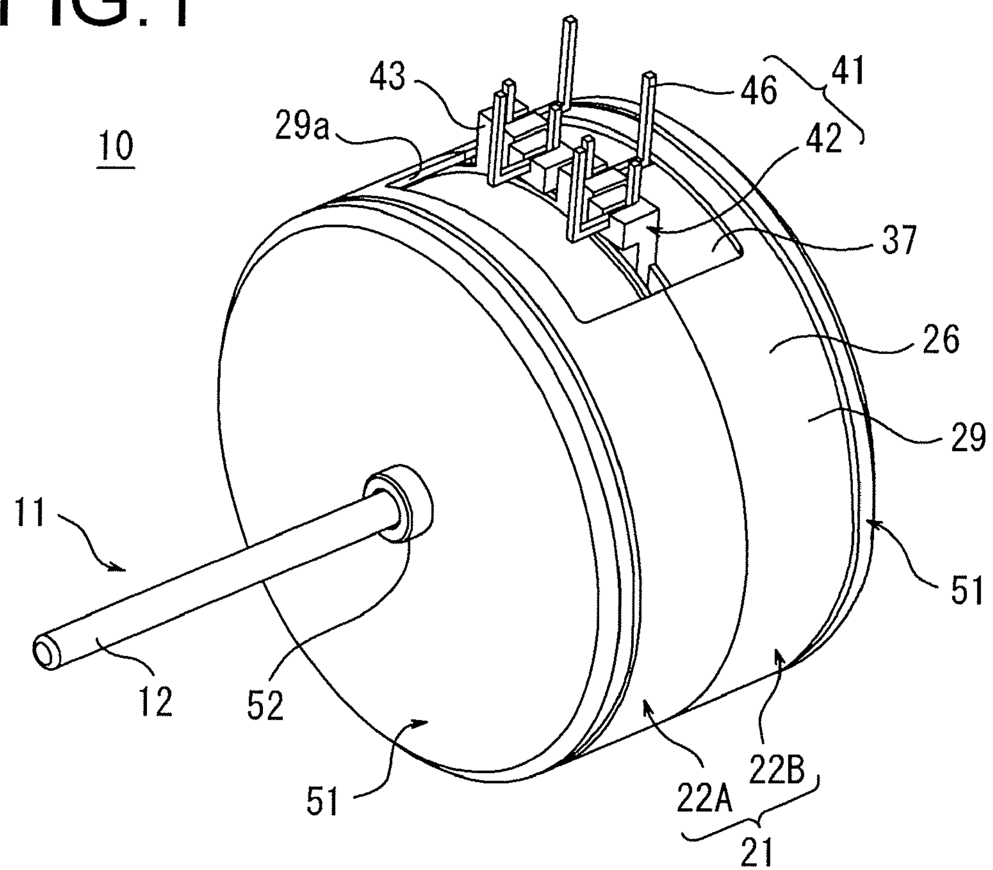
FIG. 1 is a perspective view of a stepping motor according to an embodiment of the present invention.

Referring to FIG. 1, a stepping motor 10 according to an embodiment of the present invention includes a circular cylindrical rotor assembly 11 disposed at the center of a rotation axis, an annular cylindrical stator assembly 21 disposed around the rotor assembly 11 with a predetermined gap from the outer circumference of the rotor assembly 11, and a terminal structure (structure for external connection) 41 disposed at the axially central portion of the outer circumference of the stator assembly 21.

Figure 2:
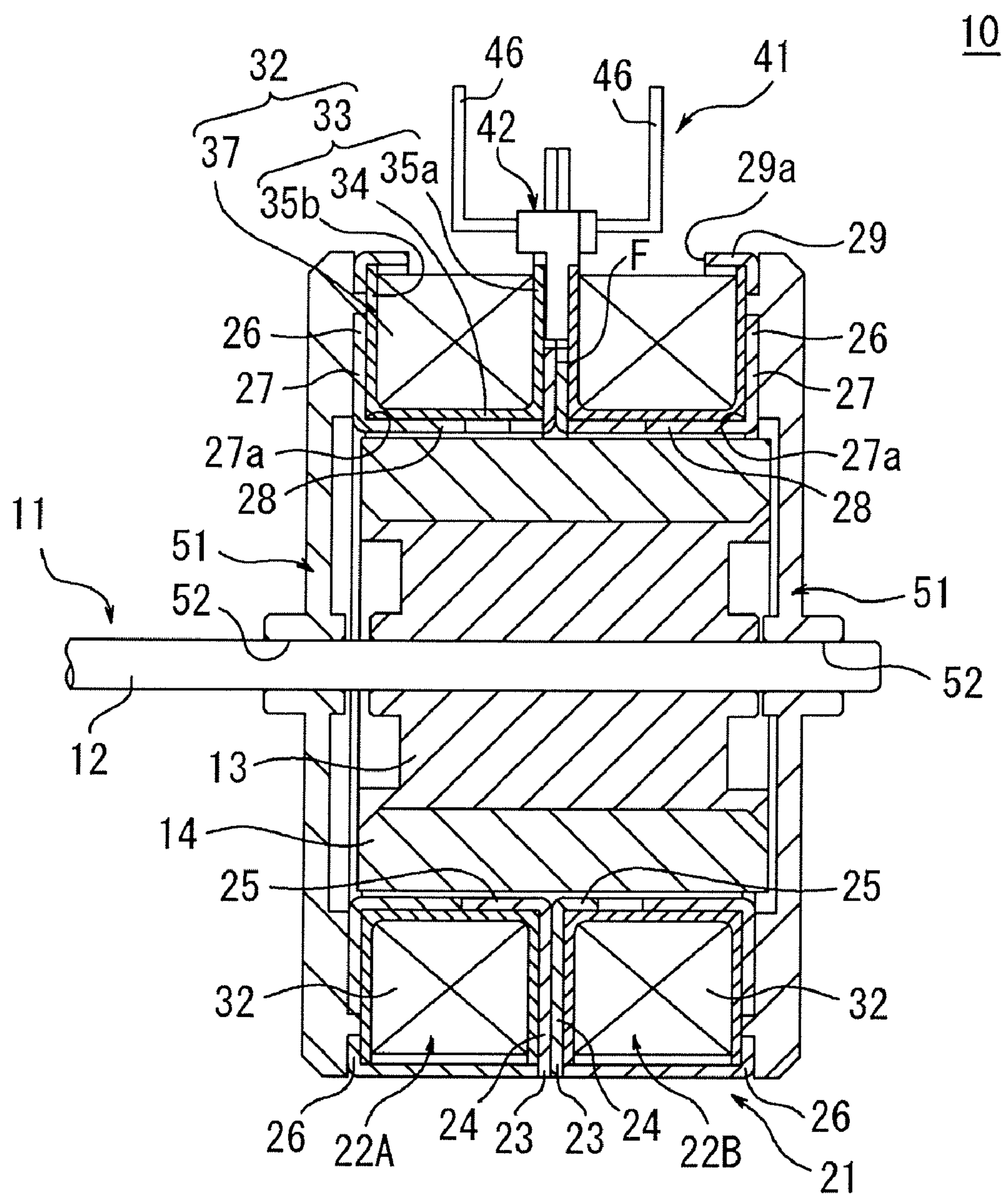
FIG. 2 is an axial cross sectional view of the stepping motor of FIG. 1, showing its internal structure.

Referring to FIG. 2, the rotor assembly 11 includes a rotary shaft 12 made of a round metal bar, and a cylindrical magnet 14 fixedly attached via a spacer 13 to the outer circumference of the rotary shaft 12 and having a plurality (forty eight in the present embodiment) of magnetic poles arranged circumferentially. The rotary shaft 12 is rotatably supported by a pair of bearings 52 and 52 provided respectively at a pair of disk-like axial end plates 51 and 51 disposed at the axial ends of the stator assembly 21.

The stator assembly 21 includes a pair (two) of annular cylindrical stator units 22A and 22B disposed coaxially with each other. The stator unit 22A (first stator unit) located to the left in the figure and the stator unit 22B (second stator unit) located to the right in the figure have basically the same structure and are axially coupled to each other in a symmetric manner such that respective pole teeth (to be described later) are shifted circumferentially from each other (by an electrical angle of 90 degrees in terms of phase difference). The first and second stator units 22A and 22B will be referred to collectively as stator unit 22.

Each of the first and second stator units 22A and 22B includes a pair of yokes 23 (inner yoke) and 26 (outer yoke) disposed along the axial direction, and a coil portion 32 to excite the pair of yokes 23 and 26. When the first and second stator units 22A and 22B are axially coupled to each other as described above thereby forming the stator assembly 21, respective inner yokes 23 of the first and second stator units 22A and 22B come into contact with each other and are located axially centrally, and respective outer yokes 28 are apart from each other so as to be located at both axial ends.

Figure 3:
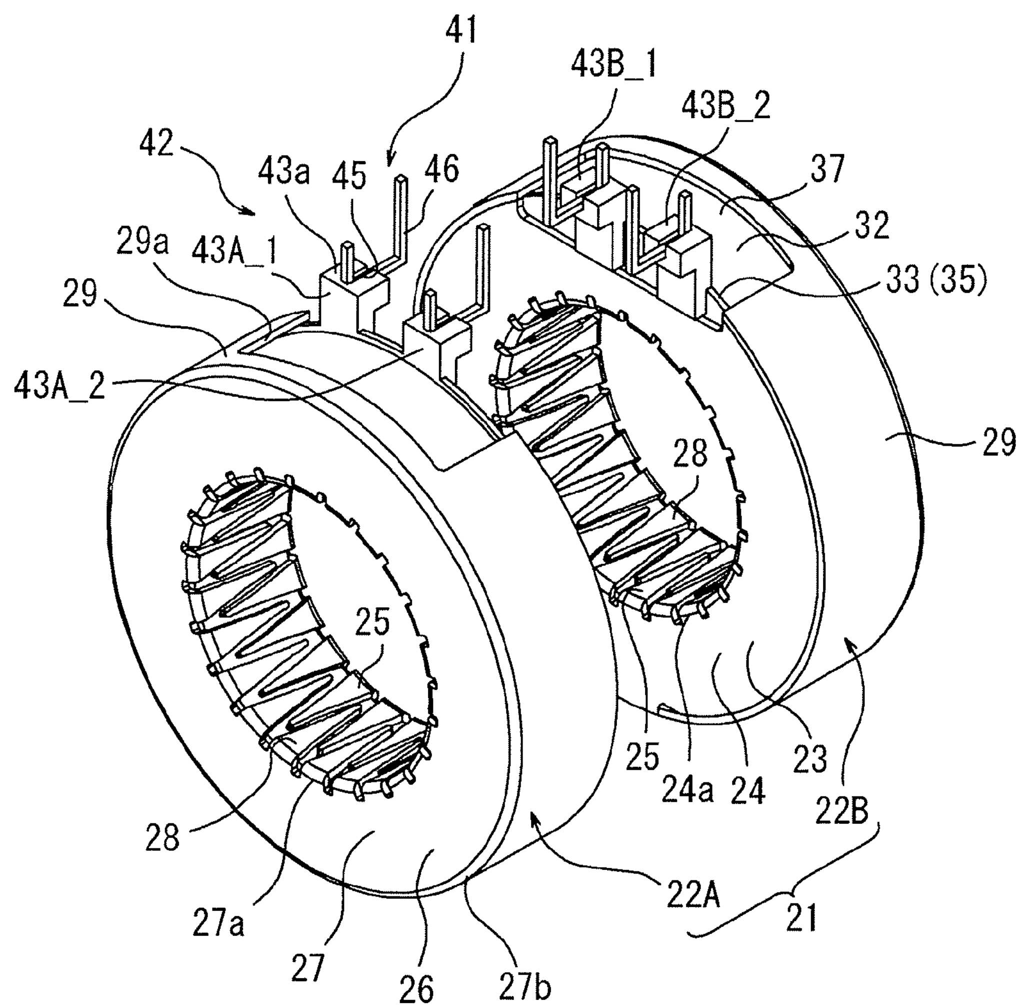
FIG. 3 is an exploded perspective view of a stator assembly composed (a pair of stator unit) and a terminal structure of the stepping motor.

Referring to FIG. 3, the inner yoke 23 is made of a soft magnetic material (iron in the present embodiment) and has a ring-shaped structure, specifically includes a base portion 24 (inner yoke base portion) having a circular ring shape and disposed orthogonal to the rotation axis, and a plurality (twenty four equal to half of the number of the magnetic poles of the magnet 13 in the present embodiment) of pole teeth 25 (inner yoke pole teeth) disposed along an inner circumference 24*a* of the base portion 24 and bent upright so as to extend axially outwardly with decreasing width. The plurality of pole teeth 25 are arranged equidistantly from one another in a comb-like manner along the inner circumference 24*a* of the base portion 24.

On the other hand, the outer yoke 26 is made of a soft magnetic material (iron in the present embodiment) and has a cup-shaped structure, specifically includes a base portion 27 (outer yoke base portion) having a circular ring shape and disposed orthogonal to the rotation axis, a plurality (twenty four which is equal to the number of the inner yoke pole teeth 25) of pole teeth 28 (outer yoke pole teeth) disposed along an inner circumference 27*a* of the base portion 27 and bent upright so as to extend axially inwardly with decreasing width, and an outer circumferential wall 29 disposed along an outer circumference 27*b* of the base portion 27 and bent upright so as to extend axially inwardly with a predetermined constant distance kept from the pole teeth 28.

And, the outer yoke 26 is axially coupled to the inner yoke 23 in a coaxial manner such that the plurality of pole teeth 28 mesh with the plurality of pole teeth 25. That is to say, the plurality of pole teeth 25 of the inner yoke 23 and the plurality of pole teeth 28 of the outer yoke 25 are disposed to complement each other in the same virtual circumferential plane. The magnet 14 of the rotor assembly 11 is disposed coaxially inside the virtual circumferential plane.

The outer yoke 26 of each of the first and second stator units 22A and 22B includes a cutout 29*a* formed at a part of the distal end of the outer circumferential wall 29, and when the first and second stator units 22A and 22B are axially coupled to each other thereby completing the stator assembly 21, an opening shaped rectangular in top plan view is formed by respective cutouts 29*a* and 29*a*. The terminal structure 41 is adapted to protrude through the rectangular opening radially outside the stator assembly 21. In this connection, the pair of outer circumferential walls 29 and the pair of axial end plates 51 and 51 described earlier in combination constitute a case of the stepping motor 10.

The coil portion 32 includes a bobbin 33 and a winding 37 and is disposed in an annular space formed between the outer circumferential wall 29 of the outer yoke 26 and the virtual circumferential plane formed by the pole teeth 25 and 28.

Figure 4A:
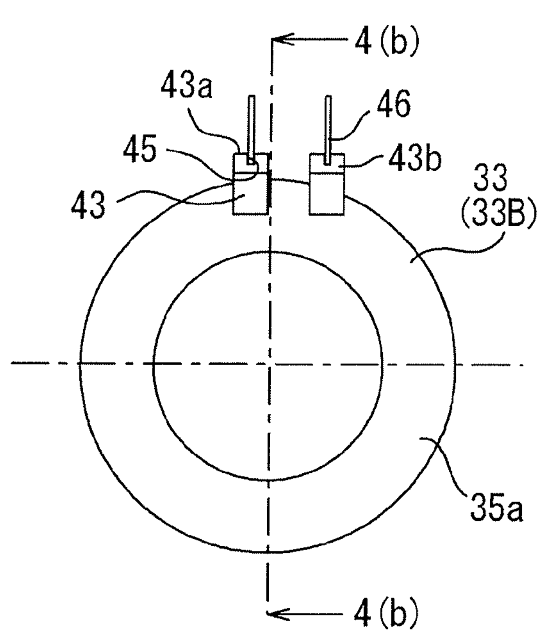
FIG. 4A is an axial side view of a pair of terminal blocks formed integrally with a bobbin of the stepping motor and each having a terminal fixed thereto.
Figure 4B:
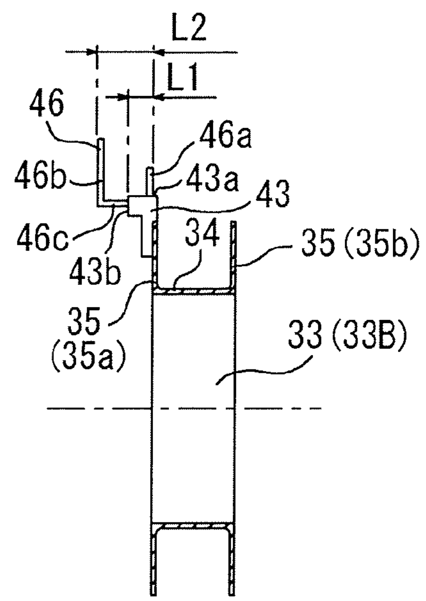
FIG. 4B is an axial cross sectional view of FIG. 4A taken along 4(*b*)-4(*b*)

The bobbin 33 is made of resin and includes, as shown in FIG. 4B, a cylindrical spool portion 34 and a pair of ring shaped flanges 35 and 35 (inner and outer flanges 35*a* and 35*b*) disposed respectively at both axial ends of the spool portion 34. When the first and second stator units 22A and 22B are coupled to each other and the stator assembly 21 is completed, two of the inner flanges 35*a* are located together at the axially central portion and two of the outer flanges 35*b* are located apart respectively at both axial end portions, wherein the inner flange 35*a* is disposed in contact with an axially outwardly facing surface of the base portion 24 of the inner yoke 23 and the outer flange 35*b* is disposed in contact with an axially inwardly facing surface of the base portion 27 of the outer yoke 26.

The winding 37 is formed such that a magnet wire is wound around the spool portion 34 of the bobbin 33 so as to be disposed between the inner and outer flanges 35*a* and 35*b*. Both wire ends (starting end 37*a* and finishing end 37*b*) of the winding 37 (magnet wire) are electrically connected to a terminal 46 (to be described later) (refer to FIG. 6).

Description will now be made of the terminal structure 41. The terminal structure 41 includes a terminal block cluster 42 and a plurality (four in the present embodiment) of terminals 46 fixedly attached to the terminal block cluster 42.

The terminal block cluster 42 includes two pairs (four pieces in total) of terminal blocks 43, wherein the two pairs are disposed at the first and second stator units 22A and 22B, respectively, such that one pair (two pieces) of terminal blocks 43 of each the first and second stator units 22A and 22B are arranged along the direction of a tangential line at the outer circumference of the base portion 24 of the inner yoke 23 and located apart from each other at a predetermined distance. When the two pairs of terminal blocks 43 are to be distinguished between phases A and B, one pair disposed at the first stator unit 22A are referred to as A-phase terminal blocks 43A_1 and 43A_2 and the other pair disposed at the second stator unit 22B are referred to as B-phase terminal blocks 43B_1 and 43B_2.

Each pair (two pieces) of the terminal blocks 43 are formed integrally with the bobbin 33. Specifically, the pair of A-phase terminal blocks 43A_1 and 43A_2 are formed integrally with the bobbin 33 (33A) which constitutes the first stator unit 22A, and the pair of B-phase terminal blocks 43B_1 and 43B_2 apart from each other are formed integrally with the bobbin 33 (33B) which constitutes the second stator unit 22B.

Referring to FIG. 4B, each of the terminal blocks 43 is formed at the outer circumferential portion of the inner flange 35*a* of the bobbin 33 so as to protrude axially from an outer surface of the inner flange 35*a* in a direction away from the winding 37 wherein the terminal block 43 has an L-shape in axial cross section, and a side face (opposite to a axial foremost end face 43*b* to be described later) of the terminal block 43 facing toward the winding 37 is flush with an inner surface of the inner flange 35*a* having the winding 37 thus not protruding from the inner surface of the inner flange 35*a*.

Each terminal block 43 includes a radial top end face 43*a* facing radially outwardly. A fixing hole (not shown but supposedly referred to by "(44)" for convenience purpose) extending toward the rotation axis is formed at a part of the radial top end face 43*a* located near the inner flange 35*a*, and a guide groove 45 is formed to extend from the opening of the fixing hole (44) in the direction away from the winding 37. A root portion 46*d* (to be described later) of the terminal 46 is press-fitted into the fixing hole (44), and a bridge portion 46*c* (to be described later) of the terminal 46 is accommodated in the guide groove 45.

Figure 5:
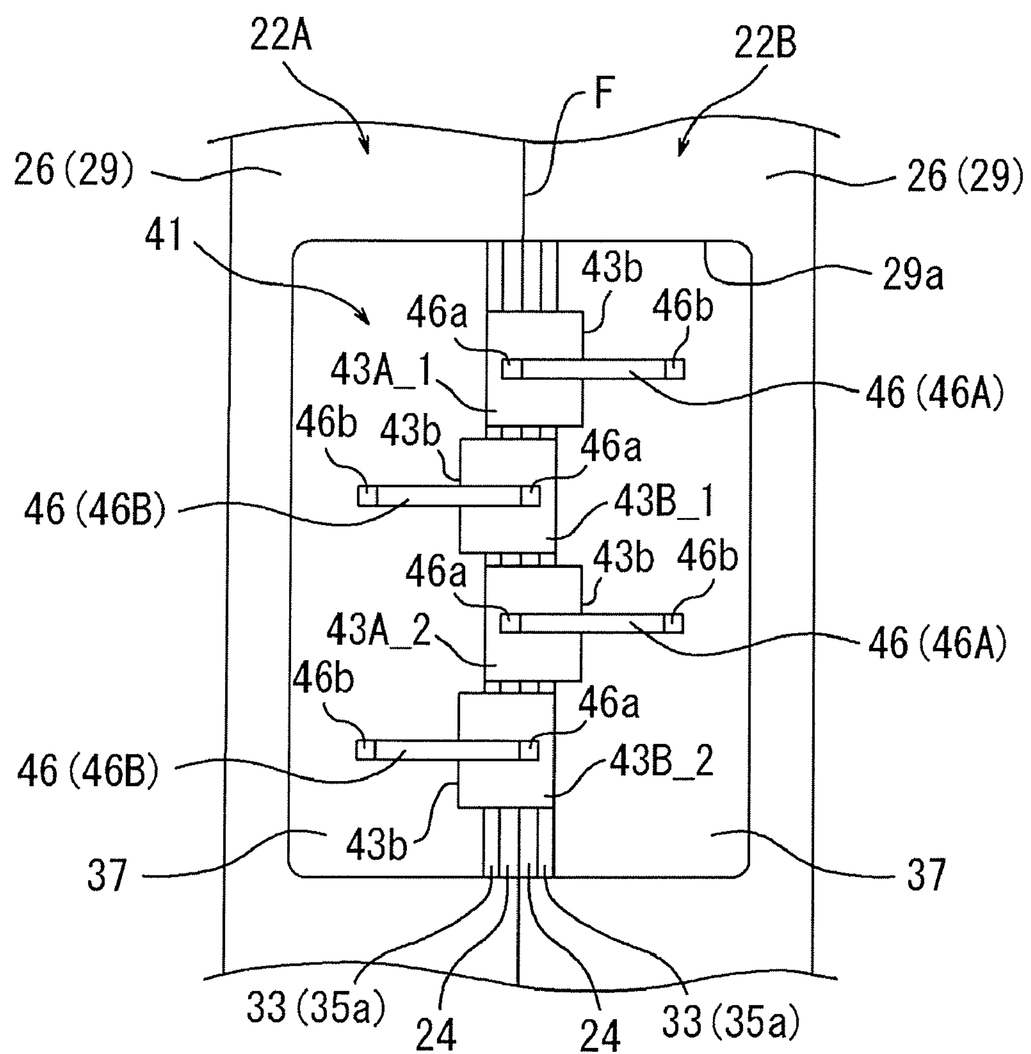
FIG. 5 is a top plan view of the terminal structure.

Referring to FIG. 5, when the first and second stator units 22A and 22B are axially coupled to each other at an interface plane F between respective base portions 24 of both of the inner yokes 24, four of the terminal blocks 43 described above are aligned along a direction orthogonal to the rotation axis (that is to say, along a direction parallel to the interface plane F) such that the pair of terminal blocks 43A_1 and 43A_2 and the pair of terminal blocks 43B_1 and 43B_2 mesh with each other, whereby the terminal block cluster 42 has a substantially rectangular shape as a whole in top plan view.

Figure 6:
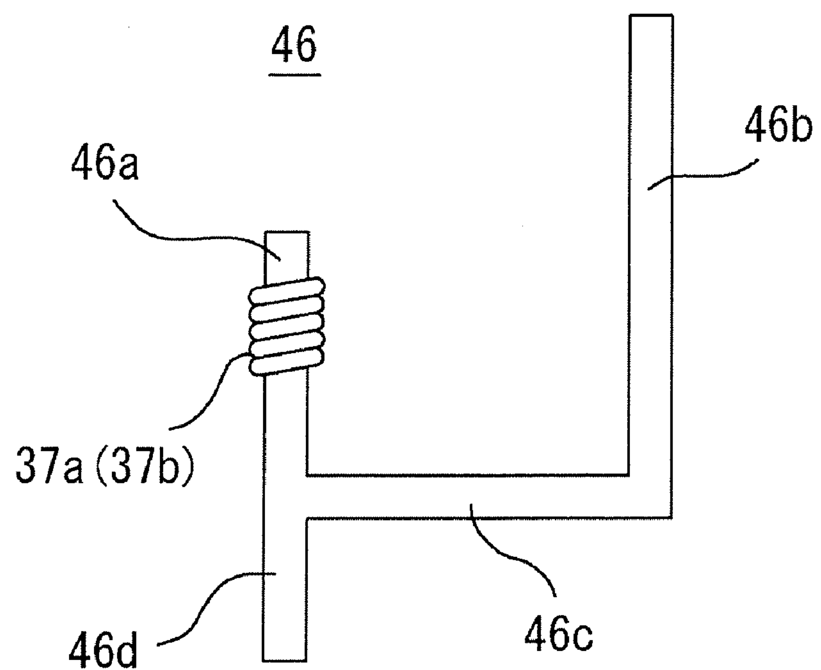
FIG. 6 is an enlarged elevation view of the terminal to be fixed to the terminal block.
Figure 7:
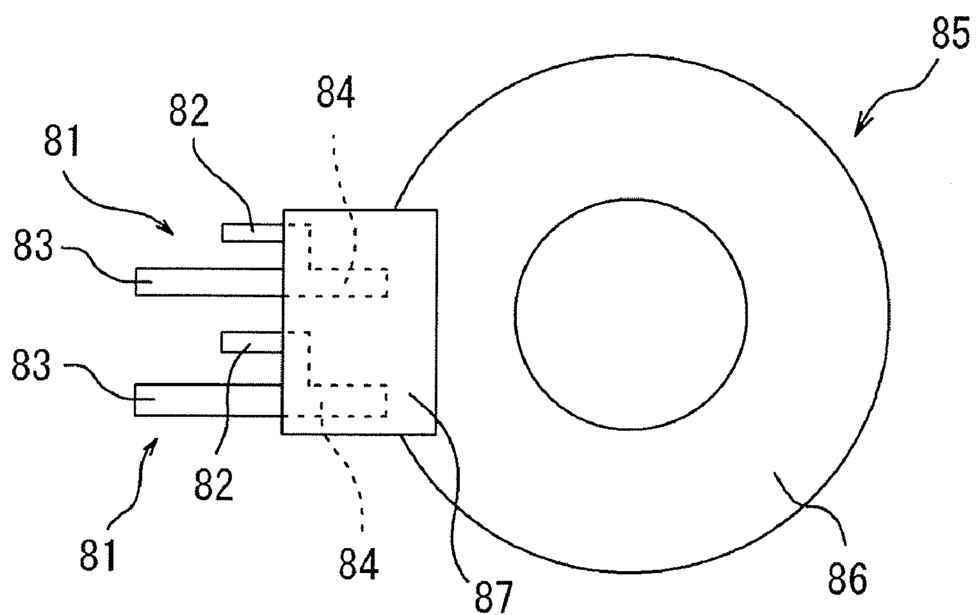
FIG. 7 is an axial side view of a terminal block and terminals according to a conventional art.

The terminal 46 to be fixed to the terminal block 43 of the terminal block cluster 42 is made of metal (tin-copper alloy in the present embodiment) and has a biforked shape as shown in FIG. 6, which is similar as in the conventional art. Specifically, the terminal 46 includes an internal connection portion 46*a* (first terminal portion) having a straight bar shape, an external connection portion 46*b* (second terminal portion) having a straight bar shape and disposed substantially parallel to the internal connection portion 46*a*, a bridge portion 46*c* having a straight bar shape and disposed orthogonal to the internal connection portion 46*a* and the external connection portion 46*b* so as to connect between respective one ends thereof, and a root portion 46*c* having a straight bar shape and extending straight from the one end of the internal connection portion 46*a*. One of the starting and finishing ends 37*a* and

37*b* of the winding 37 is wrapped around the internal connection portion 46*a* and electrically connected by means of welding (plasma welding in the present embodiment), and the external connection portion 46*b* is to relay an electrical signal from a driving circuit (not shown) disposed externally. In the present invention, the internal connection portion 46*a* is shorter than the external connection portion 46*b*, but the present invention is not limited such a dimension arrangement. Also, the whole structure does not have to be figured as shown in FIG. 6.

Four of the terminals 46 structured as described above are each fixedly attached to the terminal block 43 such that the root portion 46*d* is, for example, press-fitted into the fixing hole (44) of the terminal block 43, wherein the bridge portion 46*c* is fitted into the guide groove 44 thereby fixedly adjusting an angle of the terminal 46 with respect to the rotation axis direction. When the terminal 46 is fixedly attached to the terminal block 43, the internal connection portion 46*a* and the external connection portion 46*b* are disposed to extend radially outwardly from the bridge portion 46*c*, and the external connection portion 46*b* and a part of the bridge portion 46*c* located toward the external connection portion 46*b* are disposed to protrude axially from the earlier mentioned axial foremost end face 43*b* of the terminal block 43 which faces toward the other one of the pair of stators 22, wherein a dimension L1 of a part of the bridge portion 46 accommodated in the groove guide 44 *c* (that is to say, the dimension L1 is equal to the length of the guide groove 44) is preferably set to at least one third of a dimension L2 defined by the length of the bridge portion 46*c* (refer to FIG. 4B).

Also, referring again to FIG. 5, when the four terminals 46 are fixed to respective terminal blocks 43, the pair of terminals 46 (46A) which are fixed respectively to the pair of A-phase terminal blocks 43A_1 and 43A_2 of the first stator unit 22A are disposed such that respective internal connection portions 46*a* are located near the interface plane F, wherein the internal connection portion 46*a* and the external connection portion 46*b* are aligned with each other such that the internal connection portion 46*a* faces the external connection portion 46*b* in an axially outward direction (specifically away from the winding 37 toward the second stator 22B) substantially parallel to the rotation axis (the direction is referred to as "terminal alignment direction" as appropriate). On the other hand, the pair of terminals 46 (46B) fixed respectively to the pair of B-phase terminal blocks 43B_1 and 43B_2 of the second stator unit 22B are disposed such that respective internal connection portions 46*a* are located near the interface plane F, wherein the internal connection portion 46*a* faces the external connection portion 46*b* in alignment therewith in an axially outward direction (specifically away from the winding 74 toward the second stator 22A) substantially parallel to the rotation axis.

That is to say, four of the terminals 46 are arrayed as a whole in a line substantially orthogonal to the rotation axis, wherein the terminal alignment direction is substantially parallel to the rotation axis. Also, the pair of terminal blocks 43 (specifically the axial foremost end face 43*b*) and the pair of terminals 46 (specifically the external connection portion 46*b* and a part of the bridge portion 46*c* located toward the external connection portion 46*b*) of one stator unit 22A (22B) are formed to protrude axially beyond the inner flange 35*a* of the bobbin 33 of the other stator unit 22B (22A). And, the pair of terminal blocks 43 and the pair of terminals 46 of the one stator unit 22A (22B) are formed not to protrude toward the winding 37 of the one stator unit 22A (22B).

Description will now be made of an example method of assembling the stepping motor 10 with focus put on the coil portion 32. First, the first stator unit 22A is produced as follows. The pair of terminals 46A are fixed respectively to the pair of terminal blocks 43A_1 and 43A_2 formed integrally with the bobbin 33. Then, the starting end 37*a* of a magnet wire is wrapped several turns around the internal connection portion 46*a* of one terminal 46A of the pair and the magnet wire is wound around the spool portion 34 of the bobbin 33 thus forming the winding 37. The finishing end 37*b* of the magnet wire is wrapped around several turns around the internal connection portion 46*a* of the other terminal 46A of the pair. And, a current for plasma welding is applied to the terminal 46A in which the internal connection portion 46*a* and the external connection portion 46*b* function as a pair of electrodes, whereby the internal connection portions 46*a* of the pair of terminals 46A are electrically connected respectively to the both starting and finishing ends 37*a* and 37*b* of the winding 37.

When the coil portion 32 formed as descried above is combined with the pair of yokes 23 and 26, the first stator unit 22A is produced. When the first stator unit 22A is coupled to the second stator unit 22B produced in the same way as the first stator unit 22B, the stator assembly 21 is produced. And, when the rotor assembly 11 and the pair of axial end plates 51, 51 are attached to the stator assembly 21, the stepping motor 10 is completed.

When a driving circuit (not shown) disposed externally is electrically connected to the external connection portions 46*b* of the terminals 46, an electrical signal from the driving circuit is conducted via the terminals 46 to the pair of windings 37, and the pair of inner yokes 23 (pole teeth 25) and the pair of outer yokes 26 (pole teeth 28) are excited according to the current applied to the windings 37, whereby attraction force or repulsion force is generated between the pole teeth 25 and 28 and the magnetic pole of the magnet 14 thereby causing the rotor assembly 11 (rotary shaft 12) to rotate by a predetermined angle in a predetermined direction.

Description will next be made of advantages specific to the stepping motor 10 according to the embodiment of the present invention.

In the stepping motor 10, four of the terminals 46 are arrayed as a whole in a line at the extension of the interface plane F between the first and second stator units 22A and 22B in the direction substantially orthogonal to the rotation axis, whereby the terminals 46 can be successfully arranged even when the axial dimension of the terminal block cluster 42 is forced to be reduced thus facilitating downsizing of a motor. This is especially beneficial when the thickness of pole teeth (thickness of a base portion of a yoke) must be reduced to thereby increase the number of pole teeth for the purpose of increasing torque and enhancing resolution in rotor advance angle of a stepping motor.

Also, in the stepping motor 10, since the alignment direction of the terminal 46 is set substantially parallel to the axial direction, the distance between the internal connection portion 46*a* and the external connection portion 46*b* of the terminal 46 can be successfully increased without the necessity of increasing the dimension of a region defined by the plurality of terminals 46 measured along a direction orthogonal to the axial direction (that is the dimension of the terminal block cluster 42 measured along the direction orthogonal to the axial direction). Consequently, a sufficient work space can be provided for wrapping the starting and finishing ends 37*a* and 37*b* of the winding 37 around the internal connection portion 46*a* and the workability is enhanced. This is advantageous especially when the wrapping work is performed by an automatic winding machine.

The terminal block 43, in top plan view, is formed to protrude in a direction opposite to a direction where the winding 37, which is connected to the terminal 46 related, is disposed. The terminal 46 is disposed, in top plan view, such that the internal connection portion 46*a* around which the starting and finishing ends 37*a* and 37*b* of the winding 37 related are directly wrapped is located near the interface plane F and the external connection portion 46*b* protrudes in the direction opposite to the direction where the relevant winding 37 is disposed. And, the terminal block 43 and the terminal 46, in top plan view, are formed and disposed not to protrude into an area where the relevant winding 37 is disposed. As a result, the terminal block 43 and the terminal 46 do not hinder the work process of forming the winding 37, specifically, winding a magnet wire around the bobbin 33, and the winding process becomes easier. In this connection, the work process of winding a magnet wire is performed individually for each bobbin 33 as described earlier and therefore is not hindered even if the terminal block 43 and the terminal 46 protrude partly in the direction opposite to the direction where the relevant winding 37 is disposed.

The terminal block cluster 42 is composed of four of the terminal blocks 43 which are discrete from one another and each have one terminal 46, wherein a pair (two) of terminal blocks 43A, 43A of the first stator unit 22A mesh with a pair (two) of terminal blocks 43B, 43B of the second stator unit 22B, whereby the distance between the pair of terminal blocks 43A and 43A (43B and 43B) of the first (second) stator units 22A (22B) having respective terminals 46 can be increased. Consequently, when the starting ends 37*a* of the magnet wire is wrapped around the wire warping portion 46*a* of the terminal 46 disposed at one of the pair of terminal blocks 43A, 43A (43B, 43B), the external connection portion 46*b* of the terminal 46 disposed at the other of the pair of terminal blocks 43A, 43A (43B, 43B) does not hinder the wrapping work thus further enhancing the work process of forming the winding 37.

In the present embodiment, the dimension L1 (that is the length of the guide groove 45) is set to at least one third of the dimension L2 (that is the length of the bridge portion 43*c* of the terminal 46), whereby the alignment direction of the terminal 46 can be precisely determined.

The present invention has been described with respect to a specific embodiment but is by no means limited thereto, and various modifications are possible without departing from the spirit and scope of the present invention.

For example, in the embodiment described above, the terminal block cluster 42 includes four of the terminal blocks 43 in total such that two thereof are provided at each of the two bobbins 33 wherein one terminal 46 is disposed in total at each of the four terminal blocks 43, but the present invention is not limited to such an arrangement. Alternatively, it may be arranged that two terminal blocks in total are included such that one terminal block is provided at each of the two bobbins 33 wherein a pair (two) of the terminals 46 are disposed at each of the two terminal blocks, in which case the distance between the pair of terminals 46 is more or less restricted but certain advantages can be achieved.

Also, in the embodiment described above, the starting and finishing ends 37*a* and 37*b* of the winding 37 are connected to the terminal 46 by means of plasma welding, but the present invention is not limited to such a method and other methods (welding methods) using no solder may be employed.

What is claimed is:

1. A stepping motor comprising:

a rotor assembly comprising a magnet and rotatably disposed around a rotation axis;

a stator assembly comprising a first stator unit and a second stator unit which are disposed around the rotor assembly and axially coupled to each other and each of which comprises a yoke and a winding to excite the yoke, wherein the yoke comprises a circular ring shaped base portion and a plurality of pole teeth disposed along an inner circumference of the base portion and bent in an axial direction, and wherein the yoke of the first stator unit and the yoke of the second stator unit are in contact with each other thus defining an interface plane therebetween; and a terminal structure disposed at an outer circumference of the stator assembly along the interface plane and comprising a terminal block cluster to hold a plurality of terminals which pass to the winding an electrical signal from a driving circuit disposed externally and each of which comprises a first terminal portion to which one of two wire ends of the winding is connected, and a second terminal portion which is disposed substantially parallel to the first terminal portion and to which the driving circuit is connected, wherein the plurality of terminals are arranged in a line along a direction substantially orthogonal to the axial direction, and wherein the first terminal portion and the second terminal portion of each of the plurality of terminals are aligned along the axial direction.

2. A stepping motor according to claim 1, wherein the first terminal portion is located near the interface plane and the second terminal portion protrudes in a direction opposite to a direction where the winding whose one wire end is connected to the first terminal portion is disposed.

3. A stepping motor according to claim 1, wherein the terminal block cluster comprises a plurality of terminal blocks which are disposed apart from one another and each of which individually holds one terminal, and wherein a plurality of terminal blocks of the first stator unit and a plurality of terminal blocks of the second stator unit mesh with each other.

4. A stepping motor according to according to claim 1, wherein the terminal block cluster comprises a guide groove for accommodating a bridge portion of the terminal configured to connect between the first terminal portion and the second terminal portion, and wherein a length of the guide groove is at least one third of a length of the bridge portion.

* * * * *